United States Patent
Lynch et al.

(10) Patent No.: US 11,621,917 B2
(45) Date of Patent: Apr. 4, 2023

(54) TRANSPARENT MULTIPLEXING OF IP ENDPOINTS

(71) Applicant: ADVA Optical Networking SE, Meiningen-Dreißigacker (DE)

(72) Inventors: Robert LeRoy Lynch, Raleigh, NC (US); David Stephen Griswold, Efland, NC (US); Troy Anthony Swartz, Chapel Hill, NC (US)

(73) Assignee: ADVA Optical Networking SE, Meiningen-Dreißigacker (DE)

( * ) Notice: Subject to any disclaimer, the term of this patent is extended or adjusted under 35 U.S.C. 154(b) by 0 days.

(21) Appl. No.: 17/068,664

(22) Filed: Oct. 12, 2020

(65) Prior Publication Data

US 2021/0029035 A1 Jan. 28, 2021

Related U.S. Application Data

(63) Continuation of application No. PCT/EP2020/065245, filed on Jun. 2, 2020.

(60) Provisional application No. 62/855,009, filed on May 31, 2019.

(51) Int. Cl.
*H04L 45/745* (2022.01)
*H04L 61/5007* (2022.01)

(52) U.S. Cl.
CPC ........ *H04L 45/745* (2013.01); *H04L 61/5007* (2022.05)

(58) Field of Classification Search
CPC .................................................. H04L 45/745
See application file for complete search history.

(56) References Cited

U.S. PATENT DOCUMENTS

| | | | | |
|---|---|---|---|---|
| RE38,902 E | * | 11/2005 | Srisuresh | H04L 61/00 709/225 |
| 7,735,116 B1 | * | 6/2010 | Gauvin | H04L 63/102 713/153 |
| 2002/0196802 A1 | * | 12/2002 | Sakov | H04L 12/2881 370/392 |

(Continued)

FOREIGN PATENT DOCUMENTS

EP 1074138 A1 2/2001

OTHER PUBLICATIONS

Touysserkani, Tanja, International Search Report and Written Opinion for International Application No. PCT/EP2020/065245, dated Sep. 10, 2020, 16 pages, European Patent Office, Rijswijk, Netherlands. (The present application claims priority to this PCT case).

(Continued)

*Primary Examiner* — William G Trost, IV
*Assistant Examiner* — Monishwar Mohan
(74) *Attorney, Agent, or Firm* — Kevin E Flynn; Flynn IP Law

(57) ABSTRACT

Allowing a network function (such as a router, firewall or SD-WAN endpoint) or service chain of network functions to transparently access a network uplink, while also allowing a set of management entities to access the same link without interference or configuration. To the extent that a conflict arises between ports allocated to the management functions and to the network functions, the relevant port is automatically removed from use by management functions and allocated to network functions to end the conflict.

16 Claims, 7 Drawing Sheets

(56) References Cited

U.S. PATENT DOCUMENTS

| | | | | |
|---|---|---|---|---|
| 2007/0008964 | A1* | 1/2007 | Rose | H04L 12/66 370/389 |
| 2008/0165802 | A1* | 7/2008 | Tang | H04L 61/2578 370/466 |
| 2016/0105471 | A1* | 4/2016 | Nunes | H04L 12/4641 709/228 |
| 2016/0309534 | A1* | 10/2016 | Teyeb | H04L 61/5007 |
| 2017/0180484 | A1* | 6/2017 | Asveren | H04L 61/2514 |
| 2019/0007342 | A1* | 1/2019 | Wang | H04L 69/323 |

OTHER PUBLICATIONS

Yeom, Heon Y., IP Multiplexing by Transparent Port Address Translator, Proceedings of the Systems Administration Conference (LISA X), Oct. 4, 1996, pp. 113-121, The USENIX Association, Berkeley, California, United States (cited as D3 in the International Search Report and Written Opinion).

Jared, Bridge-mode vs IP Pass-through—Setup Information, AT&T Community Forums: ATTHelpForums found at https://forums.att.com/conversations/att-internet-equipment/bridgemode-vs-ip-passthrough-setup-information/5defbfffbad5f2f606ad5ed2?commentId=5df01905bad5f2f606c93c59, Oct. 20, 2017, 17 pages, AT&T Inc., Dallas, Texas, United States of America.

Cole Slaw, At&t Fiber using Personal Router (DMZ+ and IP Passthrough) a Story of Woe, located at https://medium.com/classic-mini-diy/at-t-fiber-using-personal-router-dmz-and-ip-passthrough-a-story-of-woe-5a79d916058a , Dec. 3, 2017, 11 pages, A Medium Corporation, San Francisco, California, United States of America.

User Kurlj, ATT fiber, differences in IP passthrough and DMZ+, located at https://www.reddit.com/r/HomeNetworking/comments/5fq99l/att_fiber_differences_in_ip_passthrough_and_dmz/ , 2017, 10 pages, reddit, San Francisco, California, United States of America.

IP Passthrough Local Security Gateway (Version 2.0), located at https://documents.swisscom.com/product/1000260-Connectivity_Geraete_/Documents/Spezifikationen/Centro_Business2_IP_Passthrough-en.pdf, Apr. 2017, 4 pages, Swisscom AG, Switzerland.

NCOS: How to Configure IP Passthrough on a capable Cradlepoint router, located at https://customer.cradlepoint.com/s/article/NCOS-How-to-Configure-IP-Passthrough-on-a-capable-Cradlepoint-router , Dec. 13, 2017, 6 pages, Cradlepoint, Boise, Idaho, United States of America.

How To: Configure IP Pass-through mode on Digi TransPorts, located at https://www.digi.com/support/knowledge-base/how-to-configure-ip-pass-through-mode-on-digi-tran, Mar. 14, 2019, 2 pages, Digi International, Hopkins, Minnesota, United States of America.

Rangerrick, Using AT&T GigaPower PACE 5268AC With Your Own Gateway, located at http://www.raccoonfink.com/blog/2018/07/27/using-att-gigapower-pace-5268ac-with-your-own-gateway/, Jul. 27, 2018.

* cited by examiner

7-Tuple Key (Wildcard Matching)

| Ingress Endpoint and interface | ethType | IP Protocol | Source IP Address | Destination IP Address | Source IP Port | Destination IP Port | Destination Endpoint and Interface | Packet Action |
|---|---|---|---|---|---|---|---|---|
| EP1/IF1 | 0x0806 | DC | DC | DC | DC | DC | N/A | L2_ARP |
| EP1/IF1 | 0x0800 | ICMP | DC | DC | ECHO (REQ) | DC | EP3/IF3 | L2_ICMP (REQ) |
| EP1/IF1 | 0x0800 | ICMP | DC | DC | ECHO (REPLY) | DC | EP3/IF3 | L2_ICMP (REPLY) |
| EP2/IF2 | 0x0800 | UDP | DC | DC | DC | 500 (IKE) | EP1/IF1 | L4 SRC Port |
| EP1/IF1 (lowest priority) | DC | DC | DC | DC | DC | DC | EP3/IF3 | L2_FWD |

FIG. 7 700

| Ingress Endpoint and interface | 7-Tuple Key (Wildcard Matching) | | | | | | | Lookup Results | | |
|---|---|---|---|---|---|---|---|---|---|---|
| | ethType | IP Protocol | Source IP Address | Destination IP Address | Source IP Port | Destination IP Port | | Destination Endpoint and interface | Packet Action | L4 Port |
| EP1/IF1 | 0x0800 | TCP | 172.1.0.99 | IP1 | 22(SSH) | 36248 | | EP3/IF3 | L2_FWD | N/A |
| EP3/IF3 | 0x0800 | TCP | IP1 | 172.1.0.99 | 36248 | 22 | | EP1/IF1 | L2_FWD | N/A |
| EP2/IF2 | 0x0800 | UDP | IP1 | 172.1.0.99 | 39010 | 500 | | EP1/IF1 | L4_SRC_PORT | *1 |
| EP1/IF1 (return flow) | 0x0800 | UDP | 172.1.0.99 | IP1 | 500 | 49152 | | EP2/IF2 | L4_DST_PORT | 39010 |

*1 = 49152 (allocated from reserved range)

TRANSPARENT MULTIPLEXING OF IP ENDPOINTS

BACKGROUND

Field of the Disclosure

This disclosure relates generally to sharing a single network IP address between and among two endpoints, services, or devices (hereafter referred to as endpoints), multiplexing the endpoint access to a single network IP address without interfering with applications, and without requiring manual configuration.

For example, the present disclosure may be used to avoid the problems created in NFV when NAT is used to share a single IP address between management endpoints and applications such as SD-WAN or firewalls. The present disclosure is also applicable to physical network functions.

Vocabulary

Or—Unless explicit to the contrary, the word "or" should be interpreted as an inclusive or rather than an exclusive or. Thus, the default meaning of or should be the same as the more awkward and/or.

Set—Unless explicit to the contrary, the word "set" should be interpreted as a group of one or more items.

Substantially—Frequently, when describing an industrial process, it is useful to note that a given parameter is substantially met. Examples may be substantially parallel, substantially perpendicular, substantially uniform, and substantially flat. In this context, substantially X means that for purposes of this industrial process it is X. So, something that may not be absolutely parallel but is for all practical purposes parallel, is substantially parallel. Likewise, mixed air that has substantially uniform temperature would have temperature deviations that were inconsequential for that industrial process. As recognized in C. E. Equipment Co. v. United States, 13 U.S.P.Q.2d 1363, 1368 (Cl. Ct. 1989), the word "substantially" in patent claims gives rise to some definitional leeway—thus the word "substantially" may prevent avoidance of infringement by minor changes that do not affect the results sought to be accomplished.

Units—Note that in order to provide focus on specific functions, the description below will reference various "units". In this context, a unit implies the required resources to perform a given set of functions. This may include a combination of electro-mechanical devices such as a microphone or a camera and the processing power to control the devices then manipulate the data obtained by the devices. In some instances, the functionality from several individually discussed units may be performed using physical components that are shared by several of the units discussed below.

Flow Table—a lookup table that contains information about each flow in terms of its classification (source and destination IP addresses, source and destination ports, protocol, ingress interface). If a lookup results in finding a match, "an entry will be returned that contains the packet action and associated data." For example, if the action is L4_SRC_PORT, the associated data would contain the port value to substitute.

Rule Table—a table that supports n-tuple pattern match lookup. If a lookup is successful, an entry will be returned that contains a destination port and packet action. The rule table may have an explicit or implied DROP action if no match is found.

Endpoint—an IP-addressable entity that sends and receives IP traffic, including:
  Management Endpoint—used for managing network access and infrastructure; and
  Network Endpoint—used for providing network services to a subscriber.

IP—internet protocol is used for constructing packets for internet access.

MAC—Media access control is responsible for the transmission of data packets to and from the network.

Address Resolution Protocol (ARP)—is a communication protocol used for discovering the link layer address, such as a MAC address, associated with a given internet layer address, typically an IPv4 address. See Wikipedia at en.wikipedia.org/wiki/Address_Resolution_Protocol.

Reserved Port—An IP L4 port reserved for use by the management endpoint.

Lookup/match—the identification of an entry in the Rule Table or Flow Table that correlates to the given search criteria (i.e. matches), where the correlation may include exact contents, patterns with wild cards, bit masks, and ranges.

WAN—Wide area network. Used to connect a customer site to the internet.

SD-WAN—is an acronym for software-defined networking in a wide area network (WAN). SD-WAN simplifies the management and operation of a WAN by decoupling (separating) the networking hardware from its control mechanism. This concept is similar to how software-defined networking implements virtualization technology to improve data center management and operation.

Network address translation (NAT)—is a method of remapping one IP address space into another by modifying network address information in the IP header of packets while they are in transit across a traffic routing device. The technique was originally used as a shortcut to avoid the need to readdress every host when a network was moved. It has become a popular and essential tool in conserving global address space in the face of IPv4 address exhaustion. One Internet-routable IP address of a NAT gateway can be used for an entire private network. See wikipedia.org/wiki/Network_address translation (https: prefix omitted).

Network Function Virtualization (NFV) can be described as having three main components (see://en.wikipedia.org/wiki/Network_function_virtualization (https: prefix omitted). Virtualized network functions (VNFs) are software implementations of network functions that can be deployed on a network functions virtualization infrastructure (NFVI).

Network functions virtualization infrastructure (NFVI) is the totality of all hardware and software components that build the environment where NFVs are deployed. The NFV infrastructure can span several locations. The network providing connectivity between these locations is considered as part of the NFV infrastructure.

Network functions virtualization management and orchestration architectural framework (NFV-MANO Architectural Framework) is the collection of all functional blocks, data repositories used by these blocks, and reference points and interfaces through which these functional blocks exchange information for the purpose of managing and orchestrating NFVI and VNFs.

Proxy server—a server for network protocols (such as DHCP) that acts on behalf of another server, or as a gateway to anther server. The client of the proxy server is not aware of its existence.

uCPE—Universal customer premises equipment (uCPE) consists of software virtual network functions (VNFs) running on a standard operating system hosted on an open server. The uCPE is the whole system including all the ports, the VNFs, the management functions, and the hosting server. An ideal uCPE deployment supports a multi-vendor, multi-component construction. As such, uCPE brings the power of the cloud to the telco network and is a gateway to innovation. See blog.advaoptical.com/en/what-is-universal-cpe.

Related Art

FIG. 1 shows an example of broadband internet access. These types of services typically provide the user with a single dynamic public network IP address (IP1) 104 that is provisioned by the Dynamic Host Configuration Protocol (DHCP) protocol.

Multiple endpoints (SD-WAN 132 and public management VRF 128) need to access the internet, and each has its own private IP address (IP2 108 and IP3 112). The usual way to accomplish sharing of a single public network IP address (IP1) 104 is to use network address translation 150 (NAT). NAT 150 maps multiple IP source addresses (108 and 112) into a single network IP address 104 by translating the IP source address and source port field of the traffic.

NAT 150 translation manipulates packets and introduces issues with certain applications such as software-defined wide-area network (SD-WAN), login/rsh, Kerberos, IPsec, and others. Those of skill in the art will appreciate that peer-to-peer applications do not work when both peers are behind certain types of NAT.

Some applications do not work well with the use of NAT 150 translation. NAT 150 translation adds a delay (latency) as there is a translation of the IP address. Those of skill in the art will appreciate that a change of IP address triggers a need to calculate a new checksum and involves the use of a large lookup table.

Passthrough

The usual workaround to the issues described above is to introduce a passthrough feature to the NAT 150. This feature requires configuration of passthrough for certain ports. The passthrough approach is well known, and almost all modern home internet router/firewall devices support this type of feature.

The drawbacks to this passthrough approach are:

1) the passthrough ports must be explicitly configured rather than use automatic configuration; and 2) each packet is manipulated at the IP layer, introducing a heavy workload.

Cradlepoint

A more sophisticated approach is provided by Cradlepoint wireless router. It provides transparent access between a single IP endpoint and the IP network, except for reserved IP ports that must be avoided. That designated IP port is used by the Cradlepoint router for its own management.

The drawbacks to this approach are that any application that collides with the reserved IP ports will suffer a silent failure, in that any packets from the network using those ports will be intercepted by the management endpoint. The packet will not reach the intended target and will simply be discarded.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

The present disclosure allows a network function (e.g. router, firewall or SD-WAN endpoint) or service chain of network functions to transparently access a network uplink, while also allowing a set of management entities to access the same link without interference or configuration. To the extent that a conflict arises between source ports allocated to the management functions and to the network functions, the relevant source port is automatically removed from use by management functions and allocated to network functions to end the conflict.

When a router is connected to a gateway 160 (FIG. 1) via a Layer 2 interface (e.g. Ethernet), the router will adjust IP status when the Layer 2 interface transitions from Up to Down, and Down to Up. Thus, the present disclosure provides a Link State Transfer function such that the subtending network function will react to Link State changes just as if it were directly connected.

The present disclosure supports implementing a DHCP server for delivery of dynamic IP addresses to the network entity (EP3 260 FIG. 2). For example, a DHCP proxy may be implemented when EP1 is an LTE interface. In this case, EP3 believes it is obtaining IP1 via DHCP to an external server, but in fact the server is internal and is for the express use of EP3.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

FIG. 6 shows an example of Rule Table format.

FIG. 7 shows an example of Flow Table format.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The disclosure describes how to multiplex IP streams from multiple sources using a single IP address, without requiring pre-configuration of IP addresses, and without manipulating user traffic at the IP layer. In doing so it enables multiple sources to share a single WAN IP address, which enables IP applications such as SD-WAN login/rsh, Kerberos, IPsec, and others to operate properly.

The disclosure describes how a set of IP L4 ports are dynamically reserved for management traffic, and all other ports are passed through transparently. If one of these reserved ports is observed flowing from the network function, the IP L4 port is removed from the set of reserved ports for management traffic so that conflicts are avoided automatically. When a port is removed from the set of reserved ports, another port is allocated from the set of reserved ports if possible.

Context

Figure 1:
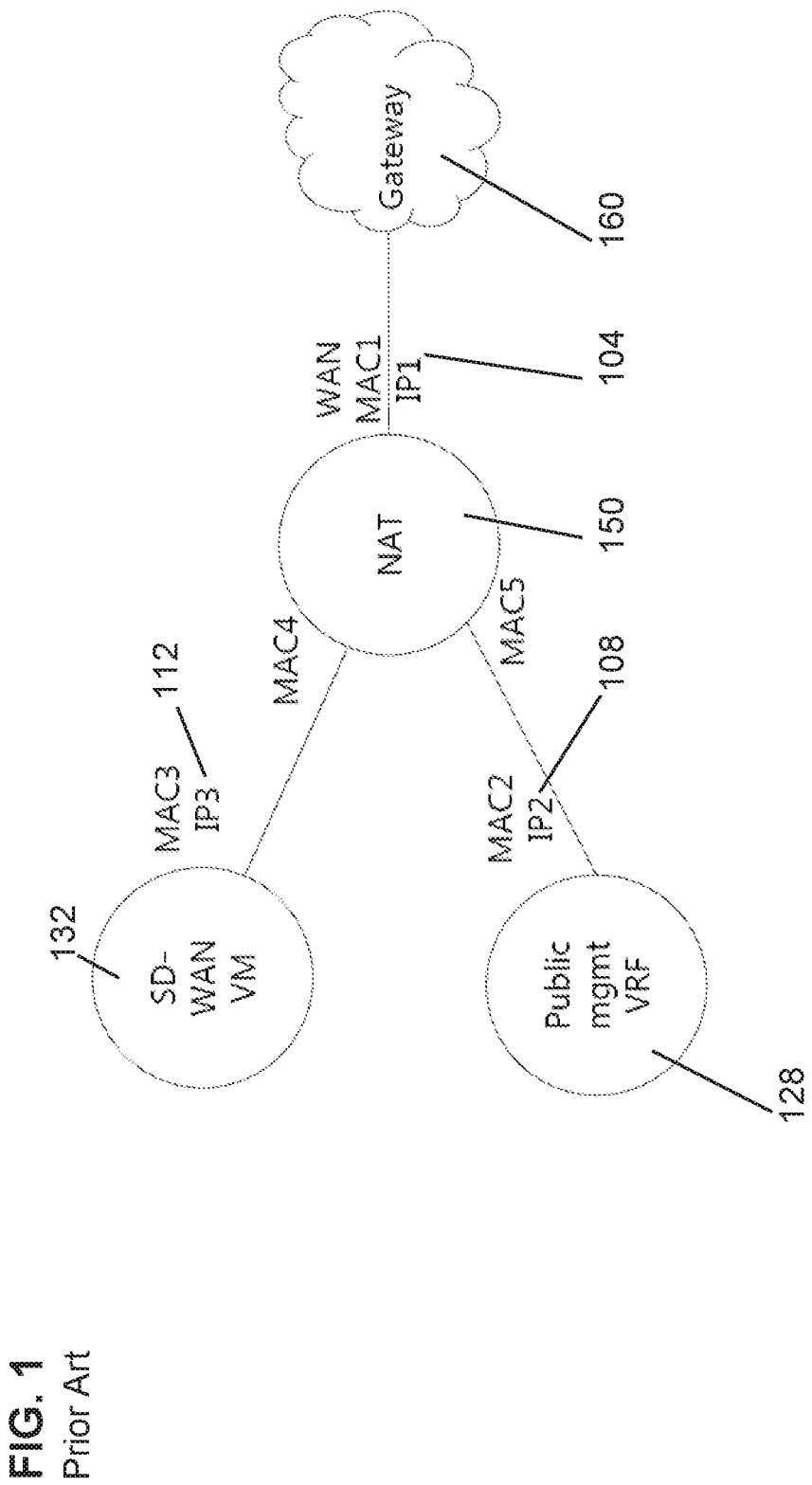
FIG. 1 shows one prior art solution.
Figure 2:
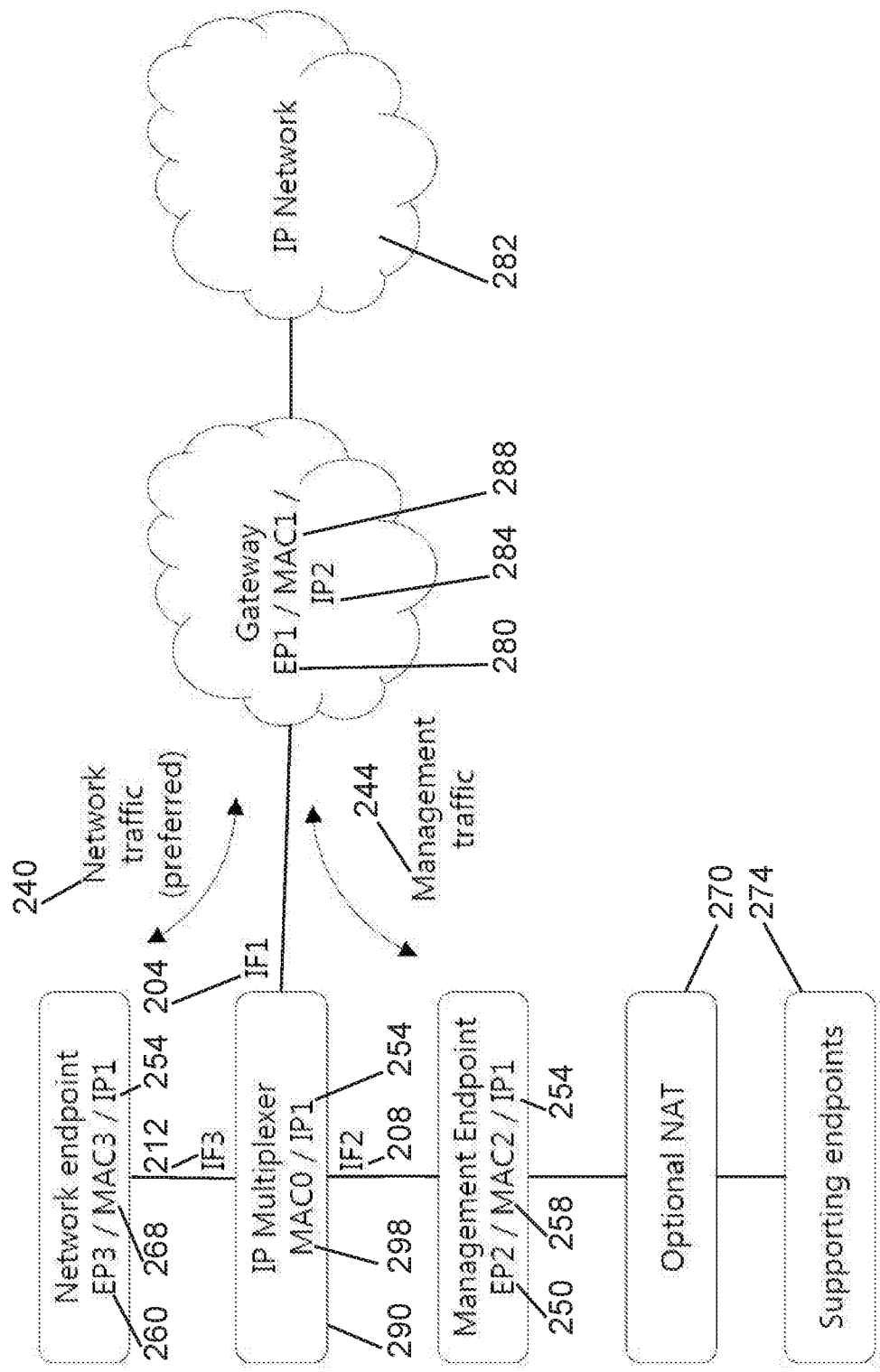
FIG. 2 shows the context for the current disclosure.

FIG. 2 shows the context of the disclosure. There are three entities connected to the IP Multiplexer interfaces:

IP Multiplexer 290 has three interfaces (204, 208, and 212). IP multiplexer 290 has IP address 254 and MAC address 298. IP multiplexer interface IF1 204 is connected to endpoint EP1 280, which is the WAN gateway, with IP address IP2 284 and MAC address MAC1 288.

IP Multiplexer interface IF2 208 is connected to endpoint EP2 250, which is the management endpoint, with IP address IP1 254 and MAC address MAC2 258. Note that there may optionally be a NAT function 270 behind this endpoint to support subtending management applications shown here in aggregate as supporting endpoints 274.

IP Multiplexer interface IF3 212 is connected to endpoint EP3 260, which is the network endpoint that also uses IP address IP1 254 but has MAC address MAC3 268. Traffic on this port needs to pass to and from EP1 280 with no changes at the IP layer. There could also be a NAT function behind EP3, completely independent the NAT function 270 behind EP2 250.

Big Picture

Sometimes it is useful to consider the big picture before getting into the details of specific processes.

At a high level, it is easy to understand that both the network endpoint 260 and the management endpoint 250 want to perform internet protocol ("IP") networking with gateway device 280. The types of management functions to be handled at management endpoint 250 are known. The destination ports for TCP or UDP traffic are known.

What is not known ahead of time is the following:

What Source Port will the management applications use on Management End Point (EP2) 250?

What source port will the network entities be using on Network End Point (EP3) 260?

To identify a distinct flow within the flow table, the seven-tuple of source IP address, destination IP address, source L4 port, destination L4 port, protocol, ethtype, and ingress end point to be unique. With unique values for the different flows, the IP Multiplexer can sort the traffic for the management endpoint EP2 250 from the traffic for the network endpoint EP3 260.

A set of port values which we can call the set of ports reserved for management packets is reserved to be the source IP L4 ports for management endpoint EP2 to use. For example, a set of 32 port values may be reserved in this way.

As there is not any effort to specially configure the network endpoint EP3 260, it is possible that EP3 traffic may include packets that use a source port that falls within the set of ports reserved for management packets. When this happens, that specific port value is removed from the set of ports reserved for management packets. In other words, the conflict over any possible dual use of the same source port value is ended by yielding to the use of that source IP L4 port by network endpoint EP3 260. The IP Multiplexer removes earlier entries in the flow table that used that IP L4 port value for management flows. The set of IP L4 ports reserved for management traffic is sized sufficiently so that the removal of one or more IP L4 ports from the set reserved for management traffic is not a problem. Once an IP L4 port that was originally in the set reserved for management traffic is no longer in use for network traffic, that port can be used again for management traffic.

Sometimes the EP3 packet uses a source port that is within the set of ports reserved for use by management packets but that port has not yet been used. Sometimes the EP3 packet uses a source port that is within the set of ports reserved for use by management packets and that port has been used by a management function but EP3 flow still wins out and takes ownership of the port address. With the flow entries removed from the flow table, the next management function packet that tries to use that source address will not find a matching 7-tuple entry in the flow table and will be handled by the rule table. An unallocated port from the set of IP L4 ports reserved for use by management packets will be assigned to this packet and a new flow table entry will be created.

The following sections describe the flow diagrams for each port.

WAN Gateway EP1 Connected to IP Multiplexer Via Interface IF1

Figure 3:
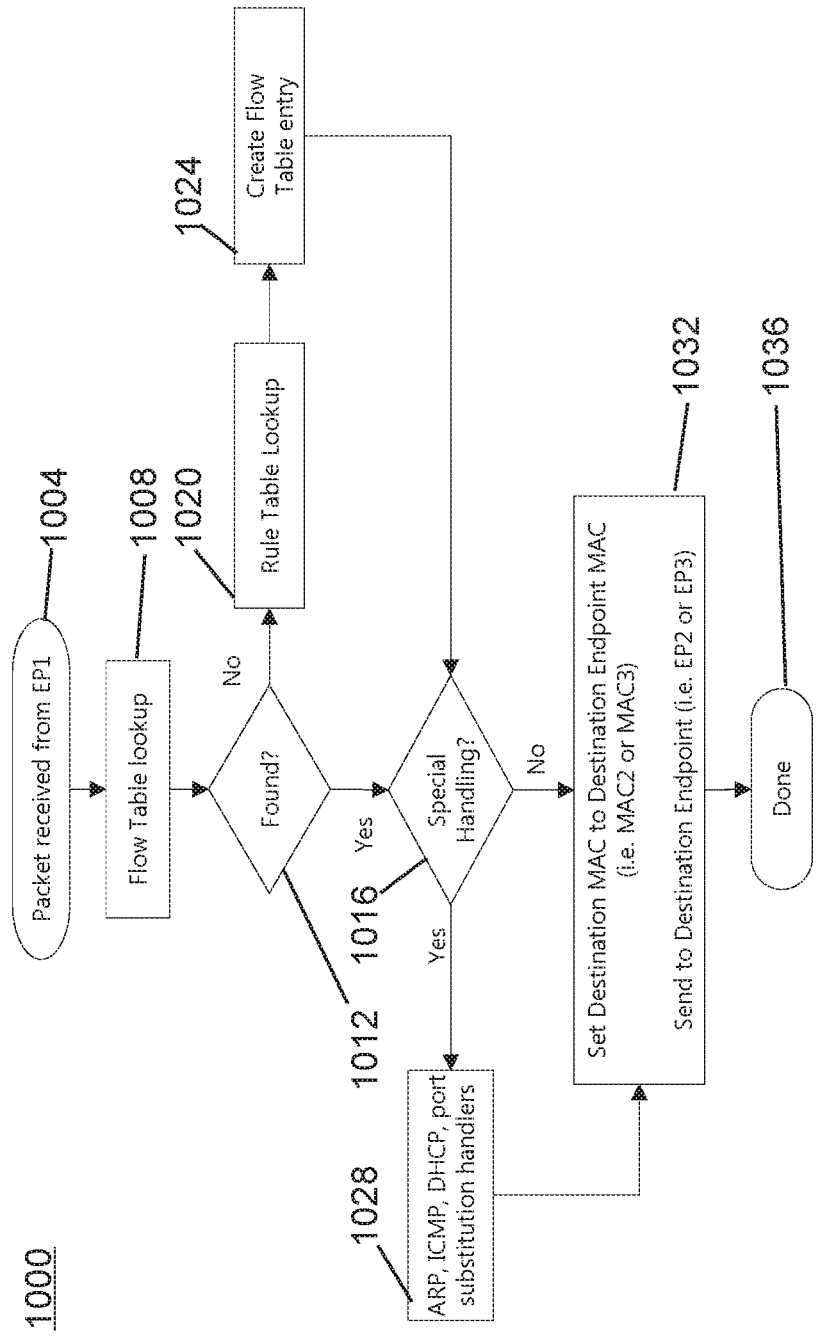
FIG. 3 shows the flow diagram for packets ingressing to the IP Multiplexer interface IF1 from the WAN gateway EP1.

While continuing to use FIG. 2 as a reference, FIG. 3 shows the process 1000 for processing packets arriving on interface IF1 204 from EP1 280.

When a packet is received on interface IF1 204 from EP1 280, the IP Multiplexer 290 calculates the destination interface or interfaces based on lookups in a dynamic Flow Table, or preconfigured Rule Table. Note that the Flow Table lookup may not find an entry, but the lookup in the Rule Table is guaranteed to return a matching entry. The Flow Table requires an exact match. A Rule Table may use table ranges, wildcards, don't care values, so that the Rule Table can be set up to handle all possible situations.

More specifically, Step 1004—A packet is received from EP1 280,

Step 1008—A Flow Table lookup is performed using a 7-tuple key (Interface, EthType, IP Protocol, Source IP Address, Destination IP Address, Source Port, and Destination Port).

Decision 1012—If the Flow Table lookup finds a match, the process moves to Decision 1016.

If at Decision 1012, a match is not found in the Flow Table, then the process moves to step 1020 which is a Rule Table Lookup. After no match is found in the Flow Table, the same 7-tuple key will be used to perform a lookup in the Rule Table which will always result in a match and then moves to Step 1024 which is the creation of a new entry in the Flow Table for this particular 7-tuple key to speed up subsequent lookups as they can be done in the smaller and faster Flow Table as a lookup in the Flow Table uses much less overhead than a lookup in a Rule Table. Note that the Rule Table is pre-configured and does not require customization before use with a specific customer.

The IP Multiplexer will apply the action returned from the either the Flow Table or Rule Table lookup and arrive at Decision 1016

If special handling is indicated in the lookup results, the process moves to Step 1028.

If the action is L2_ARP, and the packet is an ARP Request and the target IP is IP1, the IP Multiplexer responds with MAC0 298 as the hardware address in the reply.

If the action is L2_ARP, and the packet is an ARP Request and the target IP is not IP1, the packet is forwarded to EP3 260 if configured, and to EP2 250 otherwise.

If the action is L2_ARP, and the packet is an ARP Reply, and the destination MAC is MAC0 298, the packet will be sent to both endpoints EP2 250 and EP3 260 via interfaces IF2 208 and IF3 212.

If the action is L2_ARP, and the packet is an ARP Reply, and the destination MAC is the broadcast MAC, the packet is sent unchanged to both EP2 250 and EP3 260.

If the action is L2_DHCP, and the packet is a reply the IP Multiplexer makes two copies of the packet. In the first copy, the destination MAC is replaced with MAC2 258, the client hardware address in the DHCP header is replaced with MAC2 258, and the packet is sent to EP2 250. In the second copy, the destination MAC is replaced with MAC3 268, the client hardware address in the DHCP header is replaced with MAC3 268, and the packet is sent to EP3 260.

If the action is L2_ICMP, and the packet is an ECHO reply, two copies are made, both with the source MAC set to MAC0 298. Copy-one is sent to EP2 250, and copy-two is sent to EP3 260.

Whether special handling is needed or not, at Step 1032, before sending the packet, the packet will be updated with the relevant destination MAC information with the MAC for destination endpoint. For example, when sending to EP2 250, the updated destination MAC information will be changed to MAC2 258 for EP2, and likewise changed to MAC3 268 for EP3 260. The ARP response will convey to EP2 250 or EP3 260 the MAC address 288 for EP1 280.

Terminal Step 1036 sends the packet.

Staying with FIG. 2, one can see that the IP Network 282 beyond the gateway EP1 280 is connected at the IP Multiplexer 290 that uses IP1 254 for the IP address of the IP Multiplexer 290 whether the packet is destined for the EP3 network endpoint 260 or the EP2 Management endpoint 250. Thus, IP Multiplexer 290, Management Endpoint EP2 250 and Network Endpoint EP3 260 all use IP1 254.

Those of skill in the art will recognize that IP Network traffic destined to EP2 Management endpoint 250 is going to be relatively rare. One example would be a management link to allow a network operator access to the EP2 Management endpoint 250 for remote monitoring and control.

Management Endpoint EP2 Connected to IP Multiplexer Interface IF2

Figure 4:
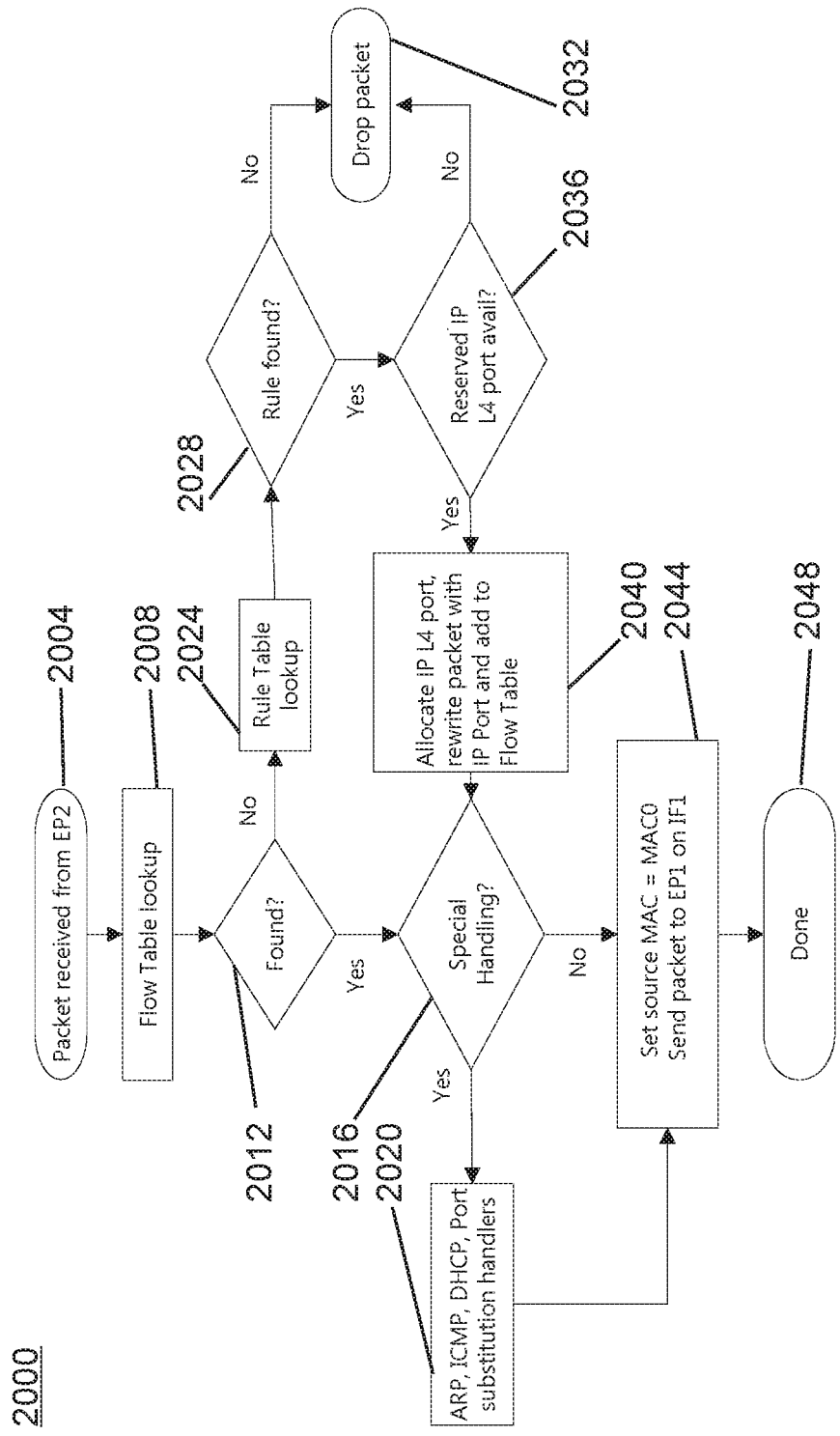
FIG. 4 shows the flow diagram for packets ingressing to the IP Multiplexer interface IF2 from the network endpoint EP2.

While continuing to use FIG. 2 as a reference, FIG. 4 shows the process 2000 for processing packets arriving at interface IF2 208 from EP2 250.

The management host endpoint may be controlling network services using Linux with a hosting platform (e.g. uCPE). Packets received on interface IF2 208 from EP2 250 are coming from the management host endpoint that has a confined TCP/UDP port space (i.e. restricted to a set of reserved ports). When a packet arrives from EP2 250, the source port is substituted with a port value from the set of reserved ports.

Those of skill in the art will appreciate that management functions naturally use their own source ports. This teachings of the present disclosure call for substitution to afford control over the values of those ports. Otherwise the source port values may collide with source ports used by the network function.

For example some application use well-known source ports, determined by the protocol. If the same application was running in the network entity as well as the management entity, there would be a collision.

By automatically forcing management applications into a configured reserved range of IP L4 port values, conflicts can be minimized. Further, in the event that a configured reserved range may itself conflict with source port values used by the network application, the management stops using that source port and gets a different IP L4 port from the reserved pool.

More specifically, at Step 2004, a packet arrives from EP2 250.

At Step 2008, the IP Multiplexer 290 processes packets from EP2 250 by first performing a 7-tuple key lookup in the Flow Table.

If the lookup finds a match in the Flow Table, a flow entry will be returned and the process will flow out Decision 2012 to Decision 2016. The flow entry contains the destination interface (always interface IF1 204 connected to EP1 280) and one of four actions, L2 ARP or L2_FWD or L4_SRC_PORT or L4_DHCP.

Decision 2016 assesses if special handling is required. If Yes, then special handing is handled at Step 2020. Almost all packets will require special handling.

If the action is L2_ARP, and the source MAC is MAC2 258, the source MAC information in the ARP packet will be updated such that it appears the packet was generated by a single system endpoint (i.e. using MAC0 298 for the IP Multiplexer 290), and then a L2_FWD action will be applied to the packet.

The L2_FWD action rewrites the Layer 2 source MAC address with the IP Multiplexer MAC (MAC0 298), rewrites the Layer 2 destination MAC with the IP Gateway MAC (MAC1 288), and then transmits the packet towards EP1 280.

If the action is L2_ARP, and the source MAC is not MAC2 258, the packet is sent unchanged to EP1 280.

If the action is L2_DHCP, the source MAC is replaced with MAC0 298, the client hardware address in the DHCP header is replaced with MAC0 298. Then the DHCP options are searched for Client ID and Hostname. If found, these options are set to zero to force the DHCP server to use the client hardware address as the identifier.

If the action is L2 ICMP, the packet is forwarded to EP 1 280 with the source MAC set to MAC0 298.

No Match in Flow Table

If Flow Table lookup at step 2008 does not find a match, the process leaves decision 2012 to step 2024. At Step 2024, the IP Multiplexer 290 will perform lookup in the Rule Table using the same 7-tuple key. If a rule entry is not found, the Decision 2028 point will lead to Step 2032 where the packet will be discarded.

If a rule entry is found, then Decision 2028 leads to Decision 2036 which checks to see if there an available IP port Available. If not, the Decision 2036 leads to Step 2032 to drop the packet.

If at Decision 2036 the action is L4_SRC_PORT, and a port value from the set of reserved ports is available, then the process moves to Step 2040 where the port value will be allocated for use as the new source port and a new Flow Table entry will be added, and rule entry action (i.e. L4_SRC_PORT, L2_ARP or L2_FWD) will be applied to the packet. When there is a need to allocate a port to use then the action is L4_SRC_PORT.

Network Endpoint EP3 Connected to IP Multiplexer Interface IF3

Figure 5:
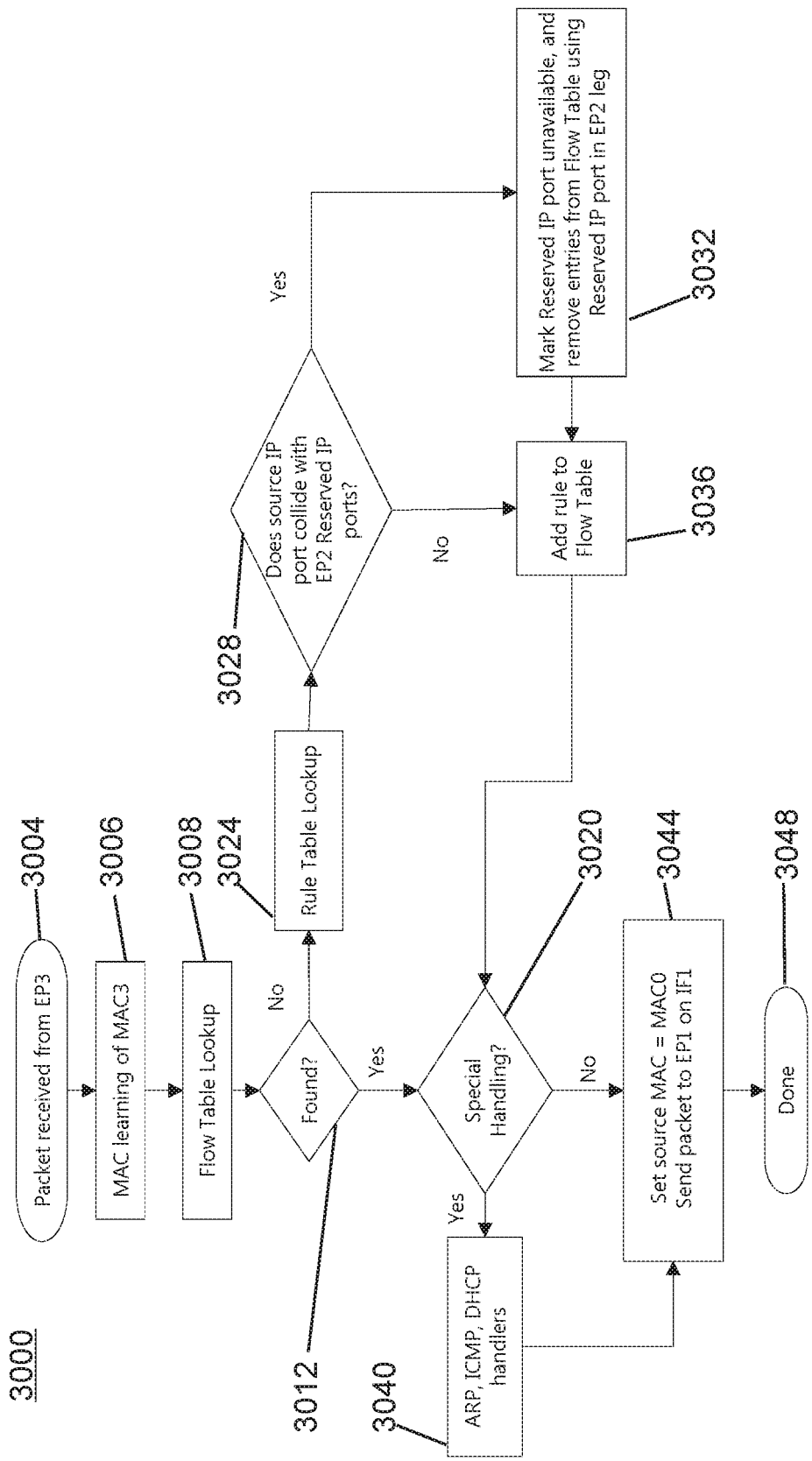
FIG. 5 shows packets ingressing to the IP Multiplexer interface IF3 from the management endpoint EP3.

While continuing to use FIG. 2 as a reference, FIG. 5 shows the processing of packets arriving at interface IF3 212 from EP3 260.

Step 3004—a packet arrives from EP3 260.

Step 3006—The IP Multiplexer 290 will record the source MAC address of the incoming packet to learn MAC3 268. This action is needed because MAC3 268 will not normally be known, and it may change. It is beyond the scope of the current disclosure, but those of skill in the art will appreciate that MAC3 268 is obtained by EP3 260 in a completely separate sub-system that is not controlled by the IP Multiplexer.

Step 3008—The IP Multiplexer will then perform a 7-tuple Flow Table lookup.

Decision 3012—If the Flow Table lookup from Step 3008 returns a flow entry, then check to see at Decision 3020 whether special processing needs to be applied at Step 3040 before proceeding to Step 3044. In other words, the IP Multiplexer 290 applies the returned action (i.e. L2_ARP, L2_DHCP, L2_ICMP, or L2_FWD) to the packet.

If Decision 3020 was that no special processing was needed, the flow goes directly to Step 3044 where the Source MAC is set to MAC0 except for an ARP with a MAC Source of MAC2. An example of no special handling would be L2 FWD. In most instances Decision 3020 will be that yes special handling is needed and the process will flow through step 3040 before reaching step 3044. The IP Multiplexer will apply the returned action (i.e. L2_ARP, L2_DHCP, L2_ICMP, or L2_FWD) to the packet and transmit the packet to the gateway EP1 280.

When the Flow Table Lookup Fails

If at Decision 3102 the Flow Table lookup in Step 3008 did not find a match, then proceed to Step 3024.

Step 3024 is a Rule Table lookup which is guaranteed to successfully return a matching Rule Table entry. As the Rule Table for EP3 260 has a default rule, the Rule Table always returns a matching Rule Table entry.

Decision 3028—The IP Multiplexer 290 then checks to see if the packet's TCP/UDP port matches one of the reserved TCP/UDP ports for EP2 traffic (management traffic). If there is not a match, the process flow moves to Step 3036 which will be discussed below.

If at Decision 3028 there is a match between the packet's TCP/UDP port and a port that is one of the reserved TCP/UDP ports for EP2 traffic, then proceed to Step 3032 where the reserved TCP/UDP port is marked unavailable for management traffic, and Flow Table entries with EP2 and reserved TCP/UDP port are removed. Then proceed to Step 3036.

At Step 3036—New Flow Table entries are added for the traffic flows from EP3 260 to EP1 280, and from EP1 280 to EP3 260. Thus, EP3 packets can cause reallocation of a port previously allocated for use for EP2 packets (management packets), with the port becoming first unallocated and then allocated to EP3 (network packets) use.

After completion of Step 3036, then the process moves to Decision 3020 and Steps 3040 and 3044 where IP Multiplexer 290 then applies the action (i.e. L2_ARP, L2_DHCP, L2_ICMP, or L2_FWD) which was returned from either the Flow Table or Rule Table lookup.

The L2_ARP, L2_ DHCP, and L2_ICMP actions are used to determine the type of packet, and what MAC fields within the packet need to be updated with the IP Multiplexer's MAC MAC0.

Two Methods for Handling L2_DHCP

If the action is L2_DHCP, the IP Multiplexer can be configured to behave in one of two ways.

First Method

Using the first method, the packet's source MAC is replaced with MAC0 298, the client hardware address in the DHCP header is replaced with MAC0 298. Then the DHCP options are searched for Client ID and Hostname. If found, these options are set to zero to force the DHCP server to use the client hardware address as the identifier. Then the packet is transmitted on interface IF1 204 to EP1 280.

Second Method

Using the second method, the IP Multiplexer 290 acts as a DHCP proxy server and replies directly to the DHCP requests providing the IP Multiplexer's IP address, IP1 254 and the Gateway's IP address 284. The second method is required if the IP Gateway 280 is not capable of responding to DHCP requests. For example, if IF1 204 is an LTE interface, then the LTE interface's IP address is acquired via LTE protocols rather than DHCP.

If the action is L2 ICMP, the packet is forwarded to EP1 280 with the source MAC set to MAC0 298.

If the action is L2 ARP, and the source MAC is MAC3, the packet is sent to EP1 with the Source MAC and source hardware address field in the ARP packet is set to MAC0.

If the action is L2_ARP, and the source MAC is not MAC3, the packet is sent unchanged to EP1.

After the update, these actions perform a L2_FWD action. The L2_FWD action rewrites the Layer 2 Source MAC with the IP Multiplexer MAC MAC0 298 and then transmits the packet on interface IF1 204 to EP1 280 at terminal step 3048.

Multiple Instances

Network endpoints such as SD-WAN may have multiple network interfaces, as can the management endpoint. In the case that multiple WAN connections are available (e.g. broadband cable and wireless), the entire IP Multiplexer 290 may be replicated, providing the same advantages on each of the network interfaces.

Link State Forwarding

Network endpoints such as SD-WAN rely on Layer 2 state for forwarding decisions. The IP Multiplexer 290 will force ports connected to EP2 250 and EP3 260 to a "down" state whenever the interface connected to EP1 280 is down, reverting to "up" when the interface connected to EP1 280 goes up. This enables the functions at EP2 250 and EP3 260 to re-route traffic if they have alternate interfaces available, as in the Multiple Instances scenario previously described. Forcing the network endpoints to adopt the status of the interface IF1 204 connected to EP1 280 allows the SD-WAN to react immediately to loss of connectivity to the gateway router EP1 280.

Rule Table Format

FIG. 6 shows an example of Rule Table format for a Rule Table 600.

The various entries within the Rule Table 600 will be understood by those of skill in the art. FIG. 6 just shows a subset of the rules, in this case rules for IP Pass-through. The following notes are relevant.

The Rule Table supports: Pattern, Range, and IP Prefix Matching.

DC when used in the Rule Table indicated Don't Care and thus matches everything.

Packets not covered by a Rule are Dropped.

Exact Action Depends on Ingress Endpoint. The ingress endpoint is one of the "tuples" used for the rule lookup.

Flow Table Format

FIG. 7 shows an example of Flow Table format. The various entries within the Flow Table 700 will be understood by those of skill in the art. The following notes are relevant.

The Flow Table 700 is an exact match hash using the 7-Tuple key.

Entries based on observed traffic after a Rule Table match.

For EP2 flows, return flow is automatically configured Thus, when EP2 traffic heads toward EP1, the process automatically sets up a flow entry for the reverse traffic (swapping the source/dest IPs and L4 ports).

Advantages

Fewer Public IPv4 Addresses

Public IPv4 addresses are a scarce resource, and network operators charge by the number of addresses used. Using the teachings of the present disclosure allows for the use of just one public IP address rather than more than one.

Dynamic Reserved TCP/UDP Ports for Endpoint EP2

The teachings of the present disclosure may be used to eliminate the need for configuration of the IP Multiplexer 290. The teachings automatically react to EP2 250 conflicts with EP3 260 source port allocations by changing the source ports allocated to EP2 250 so that the conflict is removed. This keeps user data flowing between EP1 280 and EP3 260.

Layer 2 Link State Forwarding

End-points such as SD-WAN rely on Layer 2 state for forwarding decisions. By forcing the network endpoints to adopt the status of the interface tied to the gateway router EP1, the present disclosure allows the SD-WAN or other services at either EP3 260 or EP2 250 to react to loss of connectivity on interface IF1 204 connected to the gateway router EP1 280.

Alternatives and Variations

Virtual and Physical

The teachings of the present disclosure may be applied to an IP Multiplexer 290 and related components that are virtual. The teachings of the present disclosure are equally applicable to an IP Multiplexer 290 and related components that are physical devices. Those of skill in the art will understand that one or more physical devices mapping to the components discussed in the various figures may co-exist within one device housing. The teachings of the present disclosure may also be applied to a mix of physical and virtual components.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. An IP multiplexer adapted to allow packets for use by a network endpoint to use a first IP address and to concurrently allow packets for a management endpoint within the same device as network endpoint to also use the first IP address to reduce a need to purchase more than one IPv4 address without using NAT to remap IP addresses, the IP multiplexer configured to automatically:
    receive incoming packets on a first interface from a gateway device with a first MAC address, the gateway device connected to an IP network;
    process incoming packets from the first interface before:
    sending management packets out a second interface connected to the management endpoint, the management packets adjusted to use a second MAC address associated with the management endpoint;
    sending network packets out a third interface connected to the network endpoint; the network packets adjusted to use a third MAC address associated with the network endpoint;
    wherein the processing of incoming packets from the first interface comprises:
    performing a flow table lookup to determine whether the incoming packet is a management packet or a network packet, wherein the flow table lookup uses multiple key matching that does not use a MAC address;
    if the flow table lookup fails, then perform a rule table lookup and create a flow table entry for addition to the flow table, wherein the rule table lookup uses multiple key matching that does not use a MAC address;
    maintaining a list of port values in a set of ports reserved for management packets;
    actively changing the list of port values in the set of ports reserved for management packets by responding to a receipt of a network packet using a specific port value within the set of ports reserved for management packets by:
    A) removing that specific port value from the set of ports reserved for management packets; and
    B) adjusting a flow table to reflect a change in the set of ports reserved for management function.

2. The IP multiplexer of claim 1 wherein the IP multiplexer, the network endpoint, and the management endpoint share a single IPv4 address.

3. The IP multiplexer of claim 1 wherein the IP multiplexer reacts to management endpoint port conflicts by changing the port values within the set of ports reserved for management packets.

4. The IP multiplexer of claim 1 wherein the IP multiplexer alerts the network endpoint when the IP multiplexer is down to allow the network endpoint to reroute traffic around the IP multiplexer in an alternative interface is available.

5. The IP multiplexer of claim 1 wherein the IP multiplexer alerts the management endpoint when the IP multiplexer is down to allow network endpoint to reroute traffic around the IP multiplexer in an alternative interface is available.

6. The IP multiplexer of claim 1 wherein the IP multiplexer is a virtual device.

7. The IP multiplexer of claim 1 wherein the IP multiplexer is a physical device.

8. The IP multiplexer of claim 1 wherein at least some packets originating at the network endpoint are changed by the IP multiplexer so that the at least some packets leave the IP multiplexer heading to the gateway device with a MAC address other than the MAC address of the network endpoint.

9. The IP multiplexer of claim 8 wherein the at least some packets are ARP packets.

10. The IP multiplexer of claim 8 wherein the at least some packets are ICMP packets.

11. The IP multiplexer of claim 8 wherein the at least some packets are DHCP packets.

12. The IP multiplexer of claim 1 wherein at least some packets originating at the management endpoint are changed by the IP multiplexer so that the at least some packets leave the IP multiplexer heading to the gateway device with a MAC address other than the MAC address of the management endpoint.

13. The IP multiplexer of claim 12 wherein the at least some packets are ARP packets.

14. The IP multiplexer of claim 12 wherein the at least some packets are ICMP packets.

15. The IP multiplexer of claim 12 wherein the at least some packets are DHCP packets.

16. The IP multiplexer of claim 1 wherein the flow table uses a 7-tuple value comprising:
   Ingress endpoint;
   ethType;
   IP Protocol;
   Source IP Address;
   Destination IP Address;
   Source IP Port; and
   Destination IP Port.

* * * * *